United States Patent Office 3,392,899
Patented July 16, 1968

3,392,899
PRESSURE SENSITIVE TAPES WITH SOLDERABLE LAYER
Leon E. Hoogstoel, Schenectady, N.Y., assignor to Norton Company, Troy, N.Y., a corporation of Massachusetts
Filed Nov. 3, 1964, Ser. No. 408,997
4 Claims. (Cl. 228—56)

ABSTRACT OF THE DISCLOSURE

A solderable tape, for use in making leaded glass artifacts or the like, having a flexible backing carrying a solderable coating on one surface and a pressure sensitive adhesive resistant to degradation at soldering temperatures on the other surface.

---

The present invention relates in general to pressure sensitive adhesive tapes and more specifically to such a tape capable of being soldered and especially designed for use in making leaded glass artifacts and to a method of using the same.

It has heretofore been proposed to make pressure sensitive adhesive tapes utilizing metal foil as the backing element thereof for use as reflective or decorative materials. Such prior art tapes are acknowledged but do not suggest the present invention nor are they, without modification, adaptable to the method of the present invention.

The present invention is directed primarily to those operations wherein a plurality of pieces of material are to be assembled together and soldered into a unified body. To this end, the tape of the present invention comprises a solderable backing to one surface of which is firmly bonded a pressure sensitive adhesive resistant to degradation at the temperatures employed in soldering, e.g. 350°–500° F.

One area of particular interest for use of the tape of this invention is in the manufacture of stained or leaded glass artifacts such as medallions, windows or the like. Heretofore, such items have been made by taking copper foil of a few mils thickness, cutting it into narrow strips, forming a channel out of the foil strips by folding the copper into contact with the edges of the glass and after all of the pieces of glass to be joined are so treated, placing such pieces in juxtaposition, painting flux on the surface of the copper and then leading the copper by soldering techniques. This is a very painstaking and difficult task and yet interest in this form of art work has been on the increase in recent years with courses being offered in many sections of the country at an increasing rate.

It is therefore an object of the present invention to provide a new and improved tape for use in soldering operations.

It is a further object of the invention to provide a tape of especial value in the manufacture of leaded glass artifacts.

Another object of the invention is the provision of an improved method for manufacturing leaded glass artifacts.

Additional objects, if not specifically set forth herein will be readily apparent to one skilled in the art from the following detailed description of the invention.

Figure 1:
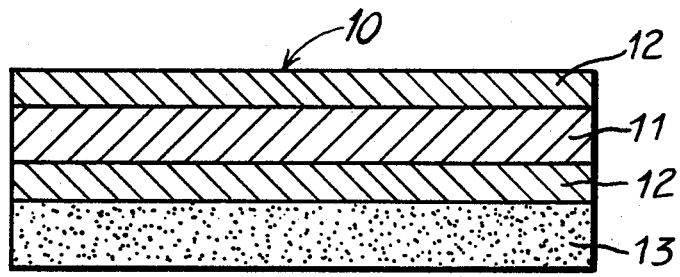
Figure 2:
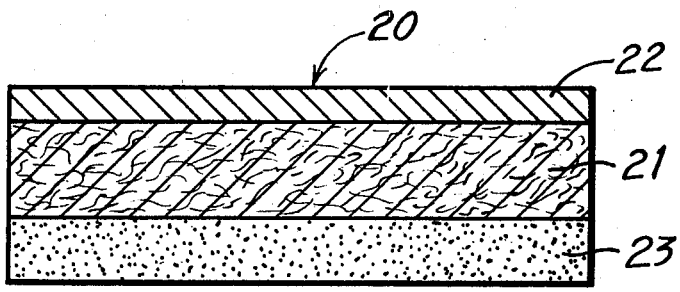

In the drawings:
FIGURE 1 represents a cross-section of one form of tape embodying the present invention.
FIGURE 2 illustrates a cross-section of another form of tape of the present invention.

Generally, the present invention comprises the provision of a pressure sensitive adhesive tape, at least the outer surface of the backing therefor being of a nature to permit soldering of such outer surface. More specifically, the backing for the tape may be composed of a material such as a copper foil which per se is solderable, or may be composed of heat-resistant films such as silicone or the like or even of papers which have been provided on the outer surface with a suitable solderable coating.

More specifically, and referring now to the drawings, FIGURE 1 illustrates a tape 10 made with copper foil as the backing member. Preferably the copper foil 11 is provided with a coating of tin 12 on both sides thereof to improve the solderability of the foil and also to protect the pressure sensitive adhesive layer 13 against deterioration as a result of contact with the copper. The tinning may be omitted if desired since adhesive formulations resistant to copper are available as illustrated below.

FIGURE 2 illustrates a modification wherein the tape 20 is composed of a paper backing 21 to the outer surface of which has been applied a layer of copper 22. This copper layer is preferably applied by vacuum deposition as illustrated in the patent to W. F. Bugbee and Robert M. Boehme, U.S. 2,879,739, assigned to National Research Corporation. Again, a layer of pressure sensitive adhesive 23 is applied to the reverse side of backing 21.

Generally, tapes according to the present invention require the interposition of a liner between adjacent convolutions since the outer surface of the tape backing usually is not provided with a release backsize, and since the most convenient form for handling tapes is in roll form. A suitable liner has been found to be a one-side coated silicone release paper of 60# basis weight (24 x 36 x 500) ream available commercially from Crocker-Hamilton Papers, Inc. under the trade name "Stick-No-Liner #661."

Suitable tapes according to the present invention have been made up from aluminum foil, copper foil and paper coated with copper. The foils may vary in thickness as desired, but 1 mil is normally used. The aluminum foil was coated on its outer surface with a room-temperature vulcanizing silicone elastomer, e.g. RTV–102 produced by the General Electric Company, allowed to dry and subsequently cure. The opposite surface was then coated with a pressure sensitive adhesive and it was found that solder would adhere tenaciously to the silicone coated foil outer surface. The copper foil was used both with and without prior tinning and with tinning on the outer surface only. Using the adhesive formulation below, it was found that the copper did not degrade the adhesive when directly coated therewith. The paper was vacuum-coated with copper by National Research Corporation and was found to be an effective backing for tapes of the present invention.

Several adhesive formulations which, when coated at a weight of 0.7 oz./square yard, are suitable for use with the present invention are as follows:

A

|  | Percent by weight |
|---|---|
| Acrylic polymer in acetone | 27.5 |
| Polyvinyl-acetate-acrylate copolymer resin | 2.4 |
| Sucrose acetate isobutyrate | 6.5 |
| Polymolecular product of alpha-methyl styrene | 1.9 |
| Toluene | 41.8 |
| Xylene | 19.9 |

B

| Chlorosulfonated polyethylene | 12 |
|---|---|
| Polychlorinated polyphenyl | 12 |
| Ethylene glycol ester of polymerized rosin | 18 |
| Toluene | 58 |

C

| | Percent by weight |
|---|---|
| Silicone (Dow #274) | 48.0 |
| Benzoyl peroxide | 0.7 |
| Toluene | 51.3 |

Tapes prepared in accordance with the present invention were utilized in making leaded glass medallions. The individual pieces of glass had a ¼″ wide tape of the present invention applied around the peripheral edges thereof and then the tape was folded so as to adhere to the top and bottom surfaces of the 1/16″ thick glass as well as to the peripheral edge. The taped glass pieces were then assembled with the taped edges touching and soldered to one another. Good anchorage was achieved with minimum ecort. Where non-tinned foil was used, a flux was first applied to the tape before soldering was attempted.

Obviously, many variations in the types of films, foils or combination backings may be employed and the selection of particular adhesives may be also varied within wide limits. Therefore, only such limitations should be imposed upon the scope of the invention as are contained in the appended claims.

I claim:

1. A solderable pressure sensitive adhesive tape which comprises:
   (a) a flexible backing having an inner and an outer surface;
   (b) a layer of solderable material coated on at least the outer surface of said backing; and
   (c) a layer of pressure sensitive adhesive resistant to degradation at soldering temperatures coated on the inner surface of said backing.

2. A tape as in claim 1 wherein said flexible backing is a metal foil.

3. A tape as in claim 1 wherein said solderable coating is tin.

4. A tape as in claim 1 wherein said pressure sensitive adhesive is resistant to degradation at temperatures up to 500° F.

References Cited

UNITED STATES PATENTS

| | | | |
|---|---|---|---|
| 2,018,117 | 10/1935 | Birk | 29—195 X |
| 2,106,133 | 1/1938 | Goldman | 117—127 X |
| 2,429,223 | 10/1947 | Eustis et al. | 117—122 |
| 2,444,830 | 7/1948 | Kellgren et al. | 161—221 X |
| 2,576,148 | 11/1951 | Schectman | 117—122 |
| 2,708,289 | 5/1955 | Collings | 117—161 X |
| 2,804,416 | 8/1957 | Phillipsen | 117—685 X |
| 2,808,352 | 10/1957 | Coleman et al. | 117—227 |
| 2,879,739 | 3/1959 | Bugbee et al. | 117—107.1 |
| 3,076,726 | 2/1963 | Ault et al. | 117—155 |
| 3,092,250 | 6/1963 | Knutson et al. | 206—59 |
| 3,132,204 | 5/1964 | Giellerup | 117—122 X |
| 3,305,323 | 2/1967 | Smith et al. | 29—180 |

FOREIGN PATENTS

| | | |
|---|---|---|
| 1,060,075 | 6/1959 | Germany. |

OTHER REFERENCES

"I.B.M. Technical Disclosure Bulletin," vol. 5, No. 2, July 1962, p. 8, Elser, T. G.

WILLIAM D. MARTIN, *Primary Examiner.*

W. D. HERRICK, B. D. PIANALTO,
*Assistant Examiners.*